(12) United States Patent
Alzu'Bi (10) Patent No.: US 11,174,833 B2
(45) Date of Patent: Nov. 16, 2021

(54) PIPE-FLOW DRIVEN ELECTRIC POWER GENERATOR DEVICE

(71) Applicant: Shadi Ibrahim Shafiq Alzu'Bi, Al-Salt (JO)

(72) Inventor: Shadi Ibrahim Shafiq Alzu'Bi, Al-Salt (JO)

(*) Notice: Subject to any disclaimer, the term of this patent is extended or adjusted under 35 U.S.C. 154(b) by 0 days.

(21) Appl. No.: 16/964,509

(22) PCT Filed: Jan. 22, 2019

(86) PCT No.: PCT/JO2019/050008
§ 371 (c)(1),
(2) Date: Jul. 23, 2020

(87) PCT Pub. No.: WO2019/145989
PCT Pub. Date: Aug. 1, 2019

(65) Prior Publication Data
US 2021/0033063 A1    Feb. 4, 2021

(30) Foreign Application Priority Data
Jan. 25, 2018   (JO) .............................. JO/2018/0007

(51) Int. Cl.
*F03B 17/06*    (2006.01)
*F03B 3/12*    (2006.01)
(Continued)

(52) U.S. Cl.
CPC .......... *F03B 17/065* (2013.01); *F03B 3/126* (2013.01); *H02K 1/276* (2013.01); *H02K 5/225* (2013.01);
(Continued)

(58) Field of Classification Search
CPC ........ F03B 17/065; F03B 3/126; F03B 13/00; H02K 1/276; H02K 5/225; H02K 7/088;
(Continued)

(56) References Cited

U.S. PATENT DOCUMENTS

2010/0186400 A1* 7/2010 Preston .................. F03G 7/10
60/325
2015/0001141 A1  1/2015 Wieland
2017/0226646 A1* 8/2017 Nourbakhsh ......... C02F 1/4606

FOREIGN PATENT DOCUMENTS

WO    2009141644 A2    11/2009
WO    2011002990 A2    6/2011
WO    2012054276 A1    4/2012

OTHER PUBLICATIONS

Austria International Searching Authority; International Search Report & Written Opinion for PCT/JO2019/050008; 10 pages; dated Jul. 4, 2019.

* cited by examiner

*Primary Examiner* — Joseph Ortega
(74) *Attorney, Agent, or Firm* — Schmeiser, Olsen & Watts, LLP (57) ABSTRACT

An electrical energy generating device (1) to transform kinetic energy of fluid passing through a pipe into electrical energy, the device may include a flow management unit (2) having a first housing (20) enclosing a plurality of tubes and a first gasket (27); a generating unit (3) having a second housing (30) with a plurality of coils (37) embedded within the second housing (30), a rotor rotatable within the second housing (30); and a connector (4) connecting the flow management unit (2) to the generating unit (3).

20 Claims, 6 Drawing Sheets

(51) Int. Cl.
*H02K 1/27* (2006.01)
*H02K 5/22* (2006.01)
*H02K 7/08* (2006.01)
*H02K 7/18* (2006.01)

(52) U.S. Cl.
CPC ........... *H02K 7/088* (2013.01); *H02K 7/1823* (2013.01); *F05B 2220/32* (2013.01); *F05B 2240/24* (2013.01); *F05B 2240/57* (2013.01)

(58) Field of Classification Search
CPC ............... H02K 7/1823; F05B 2220/32; F05B 2240/24; F05B 2240/57; F05B 2240/132; F05B 2220/20; F05B 2220/602; Y02E 10/20; Y02B 10/50
See application file for complete search history.

PIPE-FLOW DRIVEN ELECTRIC POWER GENERATOR DEVICE

CROSS-REFERENCE TO RELATED APPLICATIONS

This application is a U.S. National Phase of PCT/JO2019/050008 filed on Jan. 22, 2019, which claims priority to Jordan Patent Application No. JO/2018/0007 filed on Jan. 25, 2018, both of which are herein incorporated by reference.

TECHNICAL FIELD

The present disclosure relates to electric generator devices, and more particularly to those devices that are used to generate electricity driven by fluids flowing in pipes.

BACKGROUND INFORMATION

In most countries worldwide, remote areas may not have electrical grid systems, which makes some field work more tiresome and requiring more tools and equipment to complete the work successfully. However, some of those areas may have main networks of water pipes passing underground.

Attempts to develop electrical generators from fluids passing through pipes have been made in the prior art. For instance, the U.S. Pat. No. 9,077,220 discloses a pipeline turbine generator for generating electricity from fluid flowing in a fluid line, the line associated with, and downstream of, a wellhead and generally proximate a chemical injection pump, the pipeline turbine generator includes a turbine and associated generator, the turbine having retractable and extendable blades structured, in contracted configuration, to insert into and remove from a valve, the valve located on the fluid line running from the wellhead toward a downstream facility and proximate the chemical injection pump.

The United States patent application number 20080217923 discloses a hydraulic powered electric generator device including a tubular member having a housing, a partition and a receptacle secured to the housing, a paddle wheel rotatably disposed in the housing for being rotated by the water flowing through the tubular member, an electric generator disposed in the receptacle for generating the electric energy and a follower coupled to the spindle of the electric generator, and one or more magnetic members are attached to the follower and attached to the paddle wheel for allowing the follower and the electric generator to be driven by the paddle wheel and for actuating the electric generator to generate electrical energy.

The United States patent application number 20080219831 discloses a pipe flow-driven power generator includes a vane wheel pivotally mounted in a water chamber in a water pipe and rotatable by a flow of water running through the water pipe, a dynamo pivotally mounted on the outside of the water chamber and coupled to the vane wheel through a transmission gear set for generating electricity upon running of water through the water pipe, and a storage battery for storing electricity generated by the dynamo.

The United States Patent application number 20130049370 discloses an in-line generator device including a housing unit, wherein the housing unit is secured to a conduit on both the first end and the second end, creating a passage; a wheel encased in the housing unit that rotates with the passing of an amount of pressurized fluid; and a drive shaft secured to the center of rotation of the wheel, and protrudes out through an air tight/water tight seal from the wheel to communicate with a generator. Rotation of the wheel via the flow of fluid through the housing unit causes rotation of the drive shaft which communicates with the generator to generate electricity.

The United States patent application number 20150001141 discloses an electric generator device for generating electricity from a pressurized water circulation system including a rotor having an impeller, wherein the rotor is configured to receive liquid flow within an electromagnetic induction armature from the tubular member; a stator configured to generate electrical energy within a plurality of coils utilizing a magnetic flux generated by the electromagnetic induction armature when rotated adjacent to the stator; and a bypass tubular member configured to selectively route liquid around the electrical generator to adjust voltage of generated electrical energy.

The international patent application number WO2014012150 discloses an electric generator including a fluid inlet; a fluid outlet; and an alternator having a stator and a rotor, the rotor being hollow and in fluid communication with the fluid inlet, wherein the rotor is associated with a rotation imparting device arranged such that fluid flowing from the fluid inlet to the fluid outlet cooperates with the rotation imparting device so as to effect rotation of the rotor relative to the stator and thereby generation of electricity.

The flow of fluid in the conventional solutions mentioned above is neither constant nor regulated. Also, the conventional solutions do not have filtration capabilities that prevent suspended solids from passing between the vanes/blades. Therefore, the efficiency of those solution is limited and they are not durable if the flowing fluid has suspended solids.

SUMMARY

In aspects of the present disclosure, there is provided an electrical energy generating device to transform kinetic energy of fluid passing through a pipe into electrical energy, the device may include a flow management unit having a first housing enclosing a plurality of tubes and a first gasket; a generating unit having a second housing with a plurality of coils embedded within the second housing, a rotor rotatable within the second housing; and a connector connecting the flow management unit to the generating unit.

In aspects of the present disclosure, the first housing may include an inlet, an outlet, and two grooves.

In some aspects, a substantial number of the plurality of tubes may be twisted.

In other aspects, the plurality of tubes may provide constant fluid flow towards the generating unit.

In other aspects, the diameters of the plurality of tubes may be relatively small to prevent suspended solids from going inside the generating unit.

In other aspects, the first gasket may have a substantially conical shape with two protrusions.

In aspects of the present disclosure, the first gasket may prevent a fluid passing through the device from leaking between the plurality of tubes and the first housing, and between a rotor and a second housing.

In aspects of the present disclosure, the two grooves of the housing of the flow management unit may be configured to receive the two protrusions of the first gasket.

In yet other aspects, the second housing may further include a power outlet in connection with the plurality of coils.

In some aspects, the second housing may further include a groove.

In yet other aspects, the rotor may include an inlet with a plurality of curved vanes, a pass-through opening, and an outlet with a plurality of straight vanes.

In aspects of the present disclosure, the plurality of curved vanes may be aligned at an angle of 45° with a central axis of the device.

In aspects of the present disclosure, the plurality of straight vanes may be aligned at an angle of 45° with a central line of the device.

In other aspects, the pass-through opening of the rotor may include a plurality of magnets embedded therewith.

In some aspects, the outlet of the rotor may have a substantially tapered shaped.

In other aspects, the rotor may be free to rotate about a central axis of the device.

In some aspects, the rotor may be fixed within the housing of the generating unit using bearings.

In yet other aspects, the device may further include a second gasket.

In aspects of the present disclosure, the second gasket may have a substantially conical shape.

In some aspects, the second gasket may be in contact with the outlet of the rotor.

In other aspects, the second gasket may prevent a fluid passing through the device from leaking between the rotor and the second housing.

In yet some aspects, the fluid passing through the pipe may enter the device through the inlet of the first housing and passes through the plurality of tubes and the outlet of the first housing.

In yet other aspects, the fluid passing through the outlet of the first housing may enter the rotor through the rotor inlet and may pass through the pass-through opening and may leave the rotor through the rotor outlet.

In some aspects, the fluid passing through the rotor may collide with the plurality of curved vanes and straight vanes and may force the rotor to rotate within the second housing.

In yet other aspects, the connector may connect the first housing to the second housing by means of threads.

BRIEF DESCRIPTION OF THE DRAWINGS

The invention will now be described with reference to the accompanying drawings, which illustrate embodiments of the present disclosure, without departing from the spirit and scope thereof, and in which.

DETAILED DESCRIPTION

FIGS. 1-6 illustrate a pipe-flow driven electric power generator device 1 configured in accordance with embodiments of the present disclosure. The device 1 has a central axis 10 and may include a flow management unit 2, a generating unit 3, and a connector 4 for connecting between the flow management unit 2 and the generating unit 3. In embodiments of the present disclosure, the flow management unit 2 may include a housing 20 with an inlet 21, the inlet having a plurality of threads 22; a first set of threading 23*a*; a second set of threading 23*b*; a first groove 24*a*; a second groove 24*b*; and an outlet 25. The housing 20 may be configured to receive a plurality of adjacent tubes 26, and a first gasket 27 with two protrusions 28*a*, 28*b*.

In embodiments of the present disclosure, the inlet 21 may be connected through the plurality of threads 22 to a fluid pipe, such as a water or oil pipe (not shown), and may be configured such that the fluid flowing inside such pipe enters the device 1 through such inlet 21.

In embodiments of the present disclosure, a substantial part of the plurality of tubes 26 may be twisted about the central axis 10, wherein such plurality of tubes 26 may distribute the flow of fluid, keep the fluid flow constant, make a fluid vortex within the device of the present disclosure, and prevent solid particles suspended in the fluid which have larger diameter than that of the plurality of tubes from passing through the generating unit.

The first gasket 27 may have a substantially conical shape, wherein the fluid leaving the plurality of tubes flows through the first gasket 27. The conical shape of such first gasket 27 may contribute to an increase in the pressure of the fluid flowing through the device 1.

In embodiments of the present disclosure, the two grooves 24*a*, 24*b* of the housing 20 may be configured to receive the grooves 28*a*, 28*b* of the first gasket 27, respectively. The configuration of the protrusions 28*a*, 28*b* of the first gasket 27 and the grooves 24*a*, 24*b* of the housing 20 may prevent fluid from leaking between the housing 20 of the fluid management unit 2 and the plurality of tubes 26 enclosed therein and between a rotor 300 and a housing 30 of the generating unit 3, and may prevent the gasket form moving within the housing 20.

In embodiments of the present disclosure, the generating unit 3 may include a housing 30 with a first set of threading 31, a second set of threading 32, a first groove 33, a second groove 34, and an outlet 35 having a plurality of threads 36. The housing 30 may also include a plurality of coils 37 embedded within the body of the housing 30 between the first groove 33 and the second groove 34. In embodiments of the present disclosure, the housing 30 may also have a power outlet 38 in connection with the plurality of coils 37.

The generating unit 3 may be connected to the outlet 25 of the flow management unit 2.

In embodiments of the present disclosure, the generating unit 3 may also include a rotor 300 with an inlet 301, an outlet 302, a pass-through longitudinal opening 303 with a plurality of magnets 307 encountering such longitudinal opening 303, a first groove 304, and a second groove 305.

In embodiments of the present disclosure, the inlet 301 of the rotor 300 may include a first plurality of vanes 308, wherein such vanes 308 may have a curved shape and oriented at an angle of 45° with the central axis 10 of the device 1. The outlet 302 of the rotor 300 may also include a second plurality of vanes 309 oriented at an angle of 45° with the central axis 10.

Figure 1:
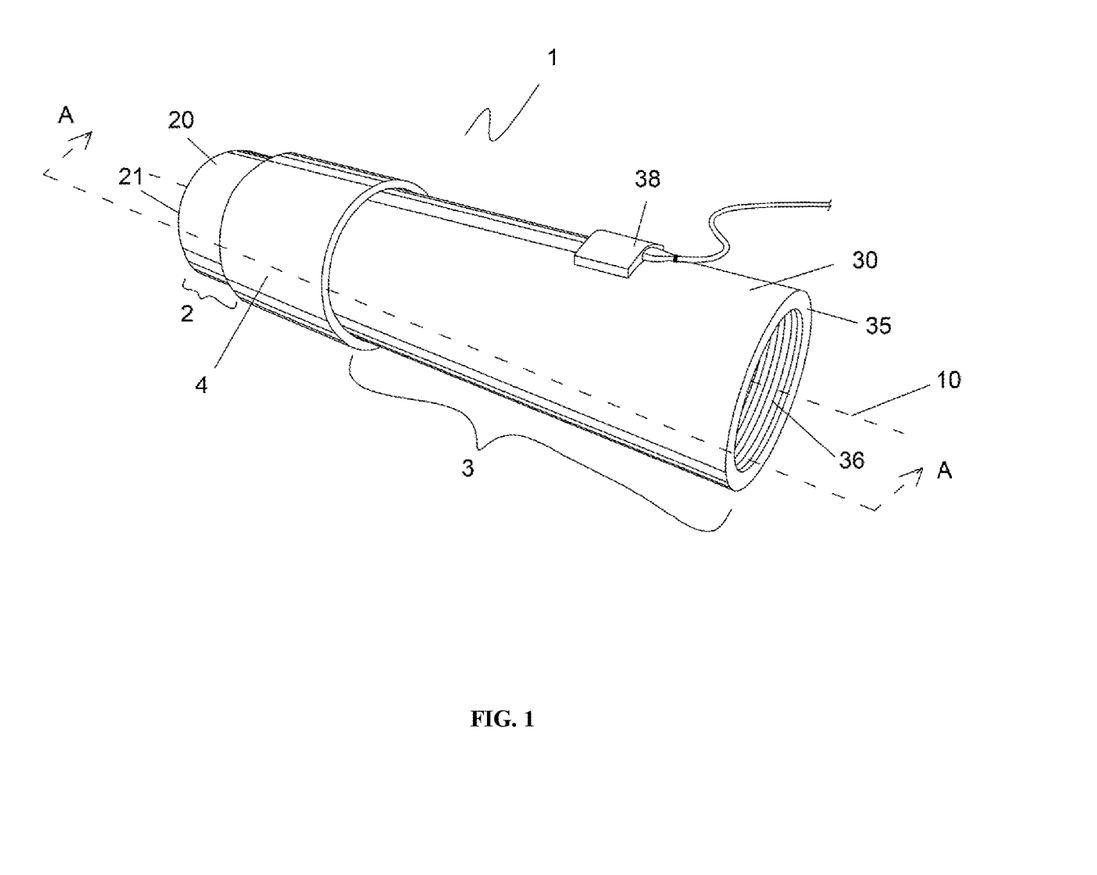
FIG. 1 is a perspective view of a pipe-flow driven electric power generator device, configured according to embodiments of the present disclosure.
Figure 2:
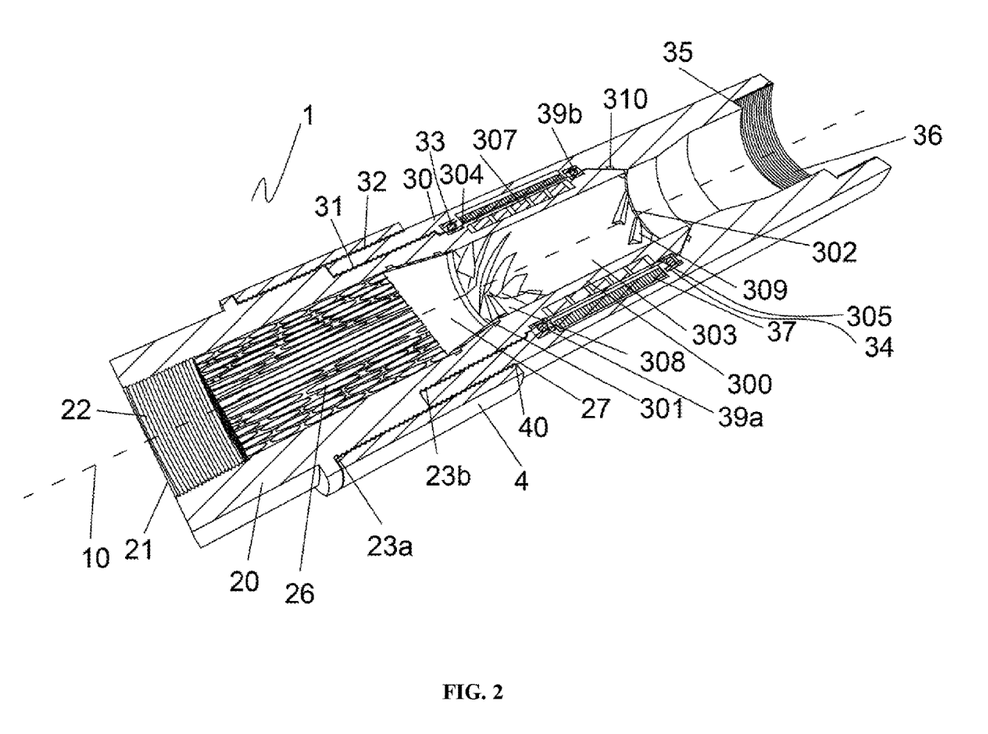
FIG. 2 is a perspective cross-sectional view of a pipe-flow driven electric power generator device taken across the line A-A of FIG. 1, the device being configured in accordance with embodiments of the present disclosure.
Figure 3:
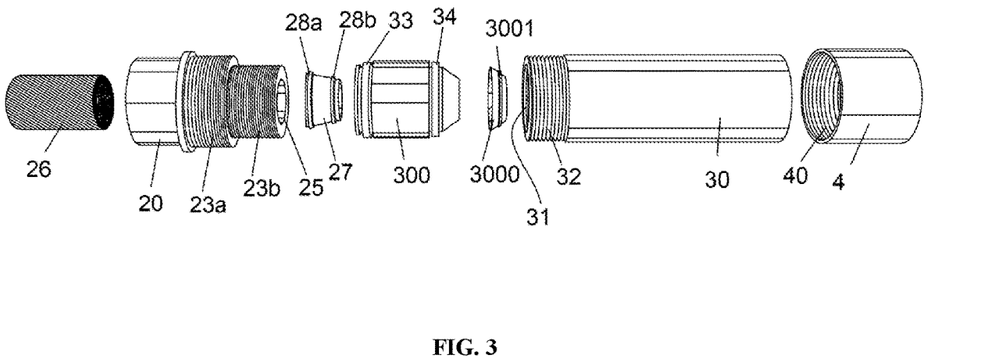
FIG. 3 is a partial exploded view of a pipe-flow driven electric power generator device, configured according to embodiments of the present disclosure.
Figure 4:
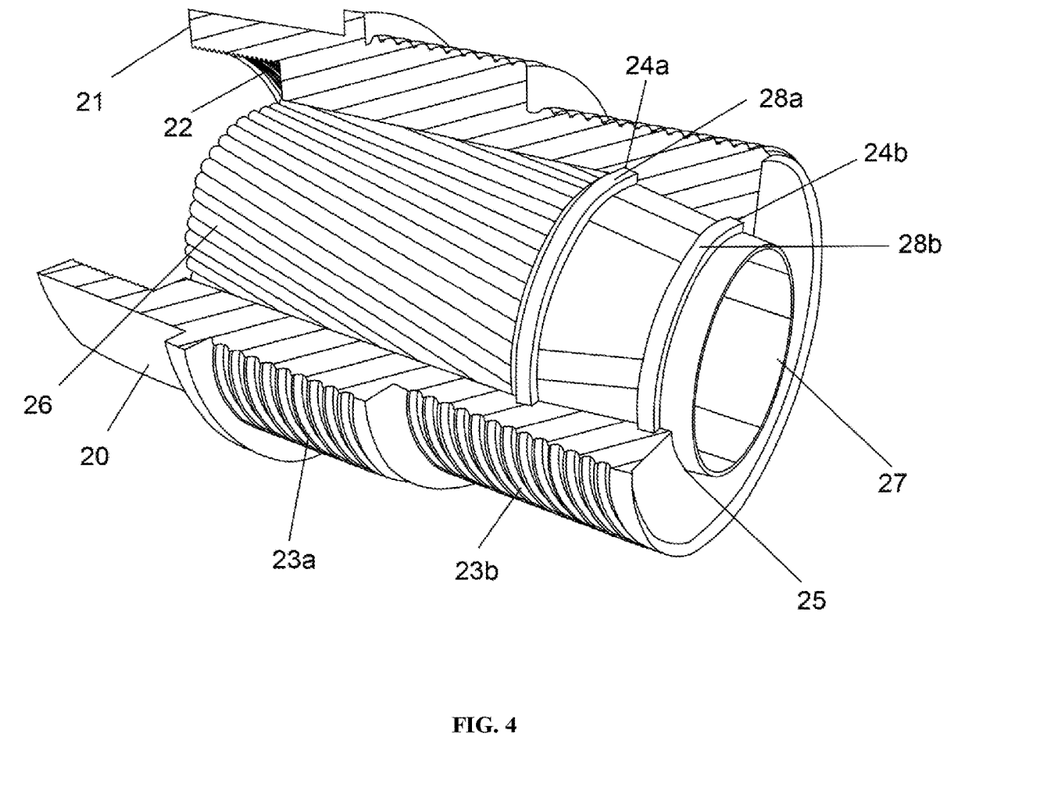
FIG. 4 is a sectional view of a flow management unit of a pipe-flow driven electric power generator device showing the internal configuration of such unit, configured according to embodiments of the present disclosure.
Figure 5:
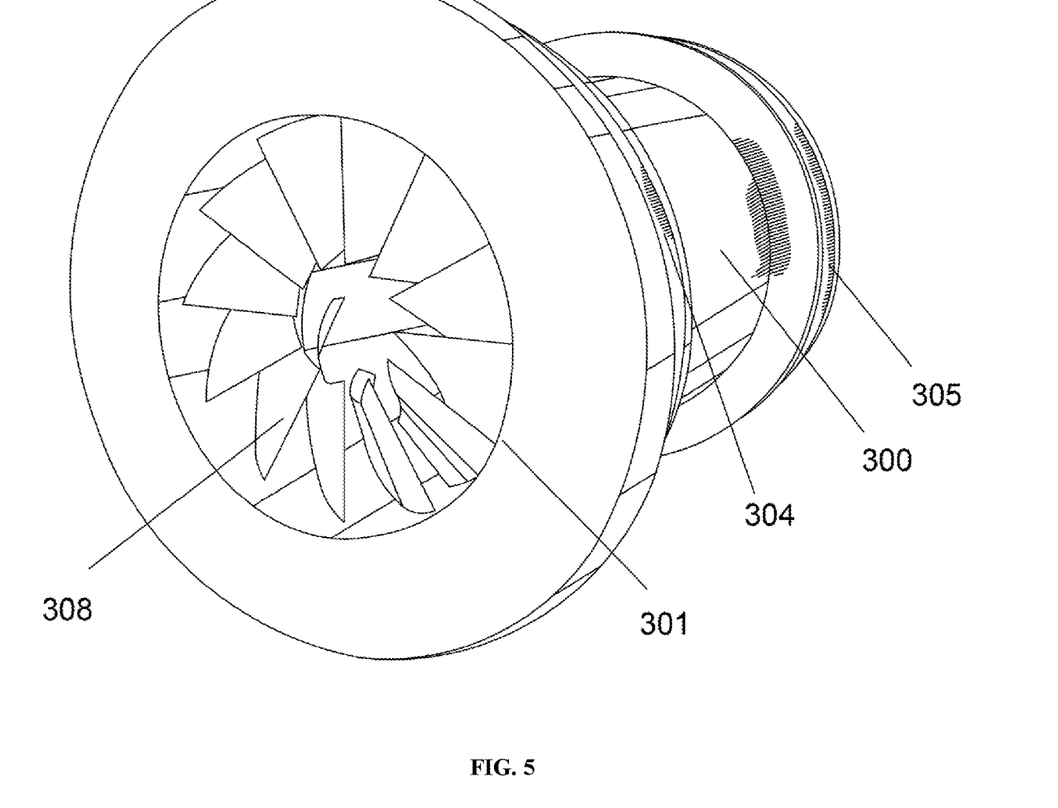
FIG. 5 is a perspective view of a rotor of a pipe-flow driven electric power generator device, configured according to embodiments of the present disclosure.
Figure 6:
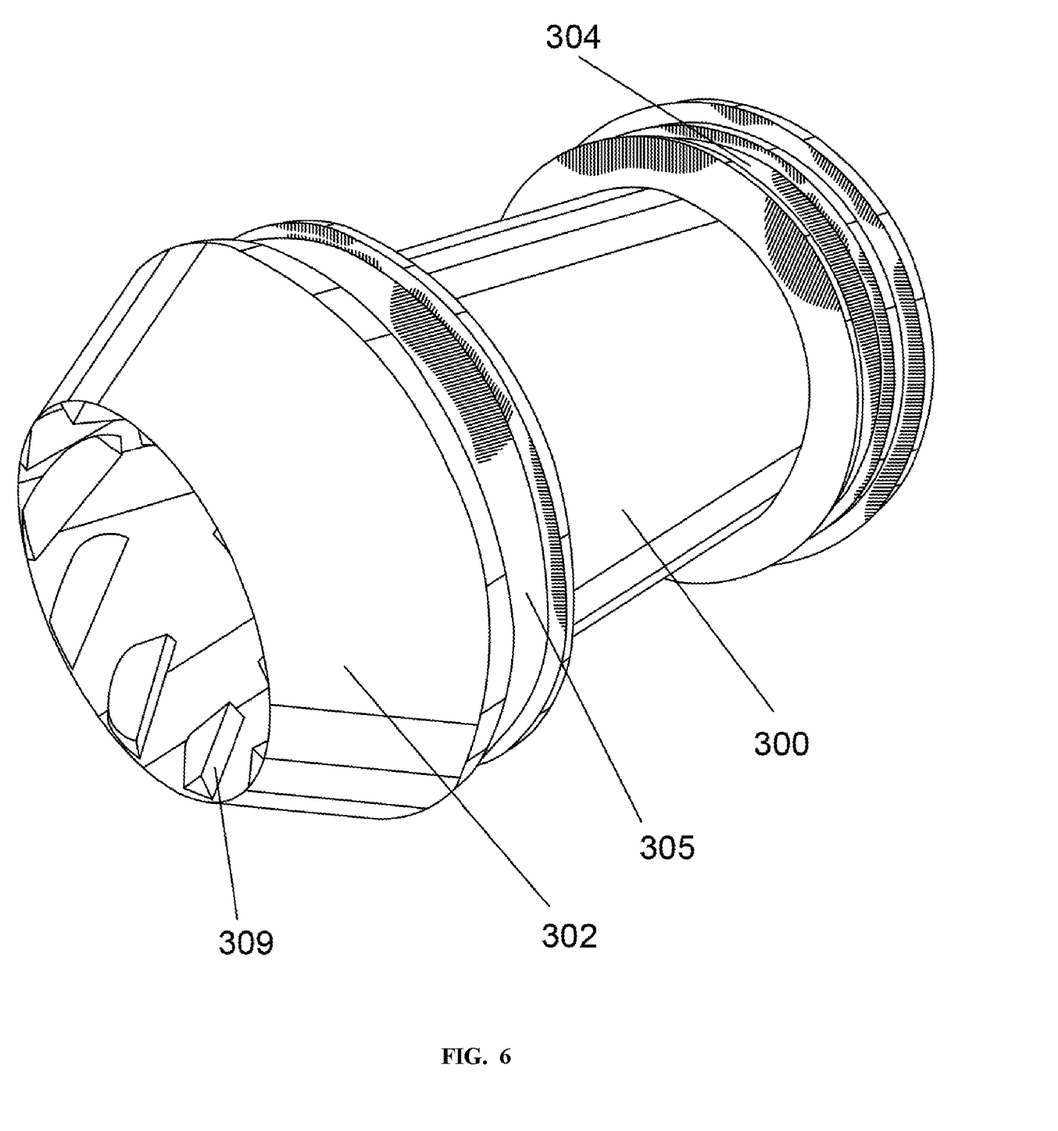
FIG. 6 is a rear perspective view of a rotor of a pipe-flow driven electric power generator device, configured according to embodiments of the present disclosure.

The second plurality of vanes 309 may be fewer in number and smaller in size compared with the first plurality of vanes 308.

In embodiments of the present disclosure, the groove 33 in the housing 30 may be aligned with the first groove 304 of the rotor 300, and the second groove 34 in the housing may be aligned with the second groove 305 of the rotor 300.

In embodiments of the present disclosure, the rotor 300 may be enclosed within the housing 30 of the generating unit 3 using a first bearing 39a, and a second bearing 39b, wherein the aligned first grooves 33, 304 may be configured to receive the first bearing 39a, and the aligned second grooves 34, 305 may be configured to receive the second bearing 39b.

The first and second bearings 39a, 39b may allow the rotation of the rotor 300 about the central axis 10 while preventing any linear movement of the rotor 300 within the housing 30.

In embodiments of the present disclosure, the fluid flowing through the outlet 25 of the fluid management unit 2 enters the rotor 300 through the inlet 301 where it collides with the first plurality of vanes 308, forcing the rotor 300 to rotate about the central axis 10. As the rotor 300 rotates, the fluid passes through the pass-through opening 303 of the rotor 300 and collides again with the second plurality of vanes 309 which also forces the rotor 300 to rotate about the central axis 10 in a same direction of rotation taking place due to the collision of the fluid with the first plurality of vanes 308. The fluid passing between each two consecutive vanes in the second plurality of vanes 309 leaves the device 1 through the outlet 35 of the generating unit 3.

When the rotor 300 rotates around the central axis 10, the plurality of magnets 307 will also rotate and the plurality of coils 37 will be crossing the magnetic flux of those magnets 307, causing an induced current in the coils 37.

In embodiments of the present disclosure, the outlet 302 may have a substantially tapered shape from the outside and may be configured to receive a substantially conical second gasket 3000. The gasket 3000 may have a protrusion 3001 and may be configured to prevent fluid from leaking between the rotor 300 and the housing 30 of the generating unit 3.

The housing 30 may further include a groove 310 configured to receive the protrusion 3001 of the second gasket 3000. The position of the protrusion 3001 within the groove 310 may prevent the second gasket 3000 from moving within the housing 30.

The plurality of threads 36 of the housing 30 may allow the outlet 35 to be connected to a conventional pipe through which the fluid leaving the device 1 passes where it continues its normal and default flow.

In embodiments of the present disclosure, the first set of threading 31 of the housing 30 of the generating unit 3 may be configured to receive the second set of threading 23b of the housing 20 of the flow management unit 2 to achieve a connection between the flow management unit 2 and the generating unit 3.

In embodiments of the present disclosure, the connector 4 may have a cylindrical shape and may include a set of internal threading 40, wherein such set of threading 40 may be configured to receive the first set of threading 23a of the housing 20 of the flow management unit 2 and the second set of threading 32 of the housing 30 of the generating unit 3.

The connector 4 may provide more robust connection between the flow management unit 2 and the generating unit 3.

While embodiments of the disclosure have been described in detail and with reference to specific embodiments thereof, it will be apparent to one skilled in the art that various additions, omissions, and modifications can be made without departing from the spirit and scope thereof.

Although the above description contains some specificity, these should not be construed as limitations on the scope of the invention, but is merely representative of the disclosed aspects of the present disclosure.

What is claimed is:

1. An electrical energy generating device to transform kinetic energy of fluid passing through a pipe into electrical energy, comprising:
   a flow management unit for managing flow of the fluid having a first housing enclosing a plurality of tubes and a first gasket;
   a generating unit for generating electricity having a second housing with a plurality of coils embedded within the second housing, and a rotor rotatable within the second housing in response to the passing of the fluid, wherein the rotor comprises a plurality of vanes and a plurality of embedded magnets; and
   a connector connecting the flow management unit to the generating unit.

2. The electrical energy generating device of claim 1, wherein substantial parts of the plurality of tubes are twisted about a central axis of the device.

3. The electrical energy generating device of claim 1, wherein the plurality of tubes are configured to provide constant fluid flow towards the generating unit.

4. The electrical energy generating device of claim 1, wherein diameters of the plurality of tubes are configured to prevent solids suspended within the fluid from going inside the generating unit.

5. The electrical energy generating device of claim 1, further comprising a first gasket configured to prevent a fluid passing through the device from leaking between the plurality of tubes and the first housing.

6. The electrical energy generating device of claim 5, wherein two grooves of the first housing of the flow management unit are configured to receive two protrusions of the first gasket.

7. The electrical energy generating device of claim 1, wherein the second housing further comprises a power outlet coupled to the plurality of coils.

8. The electrical energy generating device of claim 7, wherein the outlet of the rotor has a substantially tapered shape.

9. The electrical energy generating device of claim 1, wherein the rotor comprises an inlet with a plurality of curved vanes, a pass-through opening, and an outlet with a plurality of straight vanes.

10. The electrical energy generating device of claim 9, wherein the plurality of curved vanes is aligned at an angle of 45° with a central axis of the device.

11. The electrical energy generating device of claim 9, wherein the plurality of straight vanes is aligned at an angle of 45° with a central axis of the device.

12. The electrical energy generating device of claim 9, wherein the pass-through opening of the rotor comprises the plurality of embedded magnets.

13. The electrical energy generating device of claim 9, wherein fluid passing through the rotor collides with the plurality of curved vanes and straight vanes and forces the rotor to rotate.

14. The electrical energy generating device of claim 1, wherein the rotor is free to rotate about a central axis of the device.

15. The electrical energy generating device of claim 1, wherein the rotor is fixed within the second housing of the generating unit using bearings.

16. The electrical energy generating device of claim 1, further comprising a second gasket in contact with the outlet of the rotor, the second gasket is configured to prevent a fluid passing through the device from leaking between the rotor and the second housing.

17. The electrical energy generating device of claim 16, wherein the second gasket has a substantially conical shape.

18. The electrical energy generating device of claim 1, wherein the fluid passing through the pipe enters the device through the first housing and passes through the plurality of tubes.

19. The electrical energy generating device of claim 1, wherein the rotor is configured to transform kinetic energy of the fluid passing through the pipe into electrical energy.

20. An electrical energy generating device to transform kinetic energy of fluid passing through a pipe into electrical energy, comprising:
- a flow management unit having a first housing enclosing a plurality of tubes and a first gasket;
- a generating unit having a second housing with a plurality of coils embedded within the second housing, a rotor rotatable within the second housing; and
- a connector connecting the flow management unit to the generating unit, wherein the rotor comprises an inlet with a plurality of curved vanes, a pass-through opening, and an outlet with a plurality of straight vanes, wherein fluid passing through the rotor collides with the plurality of curved vanes and straight vanes and forces the rotor to rotate, wherein the rotor includes a plurality of embedded magnets, wherein rotation of the rotor results in rotation of the plurality of magnets resulting in the plurality of coils crossing a magnetic flux of the plurality of magnets, causing an induced current in the plurality of coils.

* * * * *